US007222532B2

(12) United States Patent
Choi

(10) Patent No.: US 7,222,532 B2
(45) Date of Patent: May 29, 2007

(54) PACKAGE FOR ELECTRO-MECHANICAL SYSTEMS

(75) Inventor: Youngmin A. Choi, Agoura Hills, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/244,966

(22) Filed: Oct. 6, 2005

(65) Prior Publication Data

US 2007/0079654 A1   Apr. 12, 2007

(51) Int. Cl.
*G01P 9/04* (2006.01)
*G01C 19/00* (2006.01)
(52) U.S. Cl. ............... 73/493; 73/504.13; 73/431
(58) Field of Classification Search ............ 73/493, 73/504.13, 431
See application file for complete search history.

(56) References Cited

U.S. PATENT DOCUMENTS

| 5,175,395 | A  | * | 12/1992 | Moore ................... 174/372 |
| 5,354,951 | A  | * | 10/1994 | Lange et al. ............. 174/372 |
| 6,722,622 | B2 | * | 4/2004  | Mori et al. .............. 248/638 |
| 6,925,893 | B2 | * | 8/2005  | Abe et al. ............ 73/862.332 |
| 7,079,381 | B2 | * | 7/2006  | Brehm et al. ............ 361/685 |

* cited by examiner

*Primary Examiner*—Helen Kwok
(74) *Attorney, Agent, or Firm*—Carmen B. Patti & Assoc., LLC

(57) ABSTRACT

A packaging system in one example comprises an improved mechanical packaging system for a circuit board disposed between housing elements, the improvement comprising an upper housing member having a centrally disposed opening provided therethrough, a unitary electromagnetic shield disposed on at least an upper surface of the circuit board and secured to the circuit board, the unitary electromagnetic shield secured to the upper housing member, such that undesired mechanical vibration modes are substantially reduced.

18 Claims, 6 Drawing Sheets

PACKAGE FOR ELECTRO-MECHANICAL SYSTEMS

BACKGROUND

This application is directed generally to housings designed for mechanical assemblies and in particular to improved packaging for a plurality of interconnected electro-mechanical assemblies, and is more particularly directed toward an improved package designed to minimize shock and vibration effects in a vibratory rotation sensor.

Complex electro-mechanical systems are often designated and implemented in a modular fashion. In other words, there may be a module (or subassembly) that contains most or all of the electro-mechanical components, as well as electrical drivers and sensors. Another module or subassembly, interconnected with the first, may then include electronic circuitry to provide necessary drive signals, amplify and/or filter sensor outputs, and provide computational or signal processing resources. The separation of system components into modules, as described above, may often be dictated by manufacturing concerns, efficient testing of manufacturing assemblies, or proper interoperability of system components.

Of course, the modules or subassemblies must then be assembled into an integrated product. This often means that an electro-mechanical subassembly must be interconnected with an electrical connection header, for example, as well as one or more circuit boards containing electronic components. Particularly where size of the finished product is a concern, this generally means that the modules or subassemblies will be in close proximity to one another, making at least mechanical contact with one another, and often both mechanical and electrical contact. There is also generally a need to provide a housing around the modules or subassemblies, and the housing also is generally in at least mechanical contact with one or more of the system modules.

Many modern electro-mechanical systems must be designed to operate in harsh environments, including environments that subject the system to extremes of shock and vibration. Since shock and vibration effects can cause unacceptable stress levels to system components and interconnections, shock and vibration performance is of significant concern to system designers.

SUMMARY

The invention in one implementation encompasses a packaging system. The system comprises an improved mechanical packaging system for a circuit board disposed between housing elements, the improvement comprising an upper housing member having a centrally disposed opening provided therethrough, a unitary electromagnetic shield disposed on at least an upper surface of the circuit board and secured to the circuit board, the unitary electromagnetic shield secured to the upper housing member, such that undesired mechanical vibration modes are substantially reduced.

Another implementation of the invention encompasses a method. The method comprising the steps of providing at least an upper housing member having a centrally disposed opening therethrough, disposing an electromagnetic shield on at least an upper surface of the circuit board, securing the electromagnetic shield to the upper housing member, such that undesired mechanical vibration modes are substantially reduced.

DESCRIPTION OF THE DRAWINGS

Features of exemplary implementations of the invention will become apparent from the description, the claims, and the accompanying drawings in which:

DETAILED DESCRIPTION

A vibratory rotation sensor is a type of complex electro-mechanical assembly that is often subjected to environmental extremes during normal operation. These environmental extremes often include a broad range of shock and vibration, so the vibratory rotation sensor must be designed to operate accurately and reliably even under the extreme operating conditions.

Figure 1:
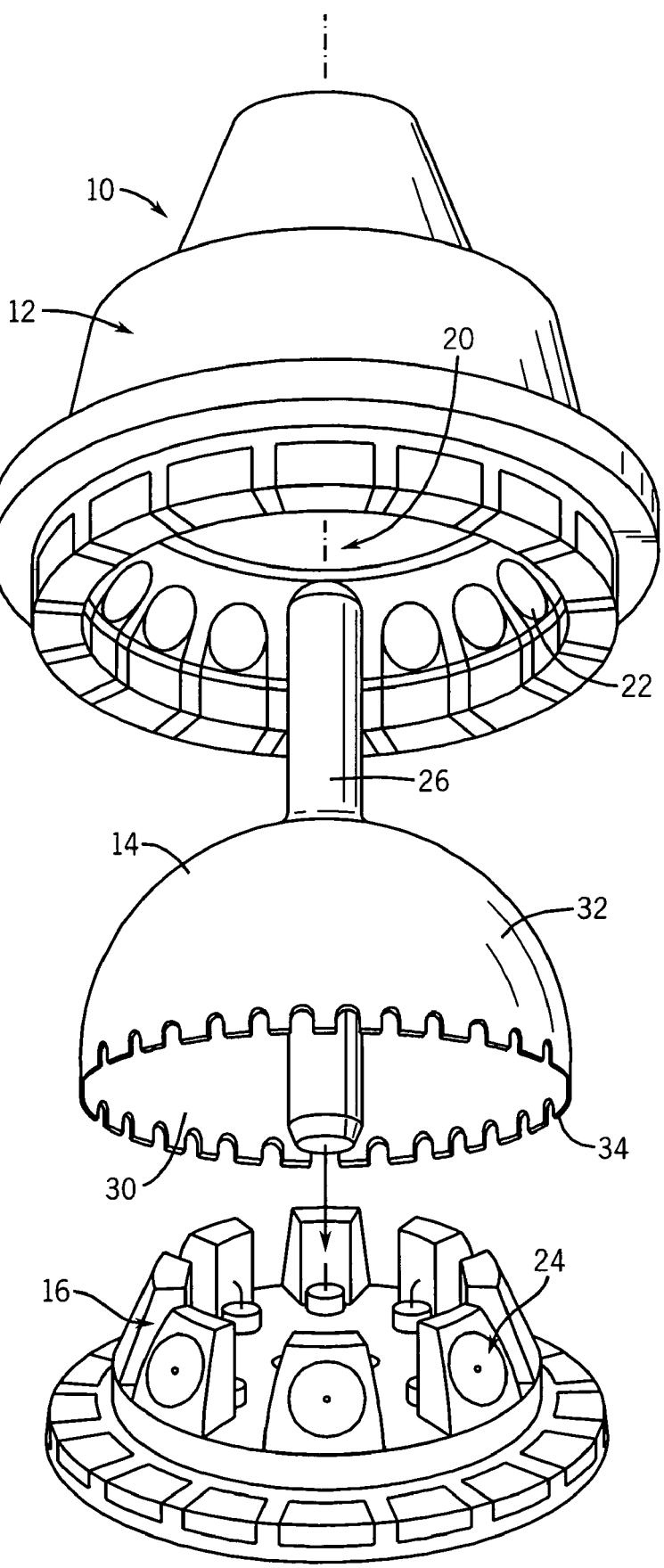
FIG. 1 is a representation of a vibratory rotation sensor of the prior art.

FIG. 1 is a simplified view of a portion of a vibratory rotation sensor 10 as known in the art. The vibratory rotation sensor 10 includes an outer support structure 12, a resonator 14 of generally hemispherical shape, and an inner support structure 16. Both support structures 12, 16, as well as the resonator 14 itself, are preferably formed from quartz. The resonator 14 is supported between the inner and outer members by a stem 26. The vibratory rotation sensor 10 is often termed a "hemispherical resonator gyro" (HRG) because it utilizes changes in vibration patterns on the thin-walled hemispherical quartz resonator 14 to detect when it is moved. The thin-walled hemispherical quartz resonator 14 is excited by an electrical field to induce a pattern of mechanical vibration. This pattern is electrically detected and used to determine changes in the HRG's subtle mechanical vibration. The mechanical disturbance in the resonator 14 is so small that there is virtually no mechanical stress or fatigue induced in the resonator 14, and therefore the device itself is a high-reliability electro-mechanical system.

As noted, an electrical excitation is required in order to induce an appropriate vibration of the resonator 14 such that standing waves may be established. To provide the excitation, a plurality of electrodes 22 are provided on an interior surface 20 of the outer support structure 12. These electrodes 22 are in close proximity to the outer surface 32 of the resonator 14, which is metallized. When an electrical signal is applied to selected electrodes 22, mechanical vibration is induced in the resonator 14 with the desired standing wave pattern.

When the HRG 10 rotates about its axis, generally normal to the plane of the rim 34 of the resonator 14, the standing wave pattern established in the resonator 14 rotates in the opposite direction. Consequently, by measuring the angle of rotation of the standing wave pattern, the rotation angle of the HRG 10 can be determined. Output signals from the resonator 14 are obtained through capacitive coupling between a plurality of output electrodes 24 and the metallized interior surface 30 of the resonator 14. The output electrodes 24 are disposed on the inner support structure 16. The vibration mode of the resonator 14 causes changes in capacitance that are readily measured at the output electrodes 24. This capacitance data is sufficient to enable sensing circuitry to establish the degree of rotation of the HRG 10.

Figure 2:
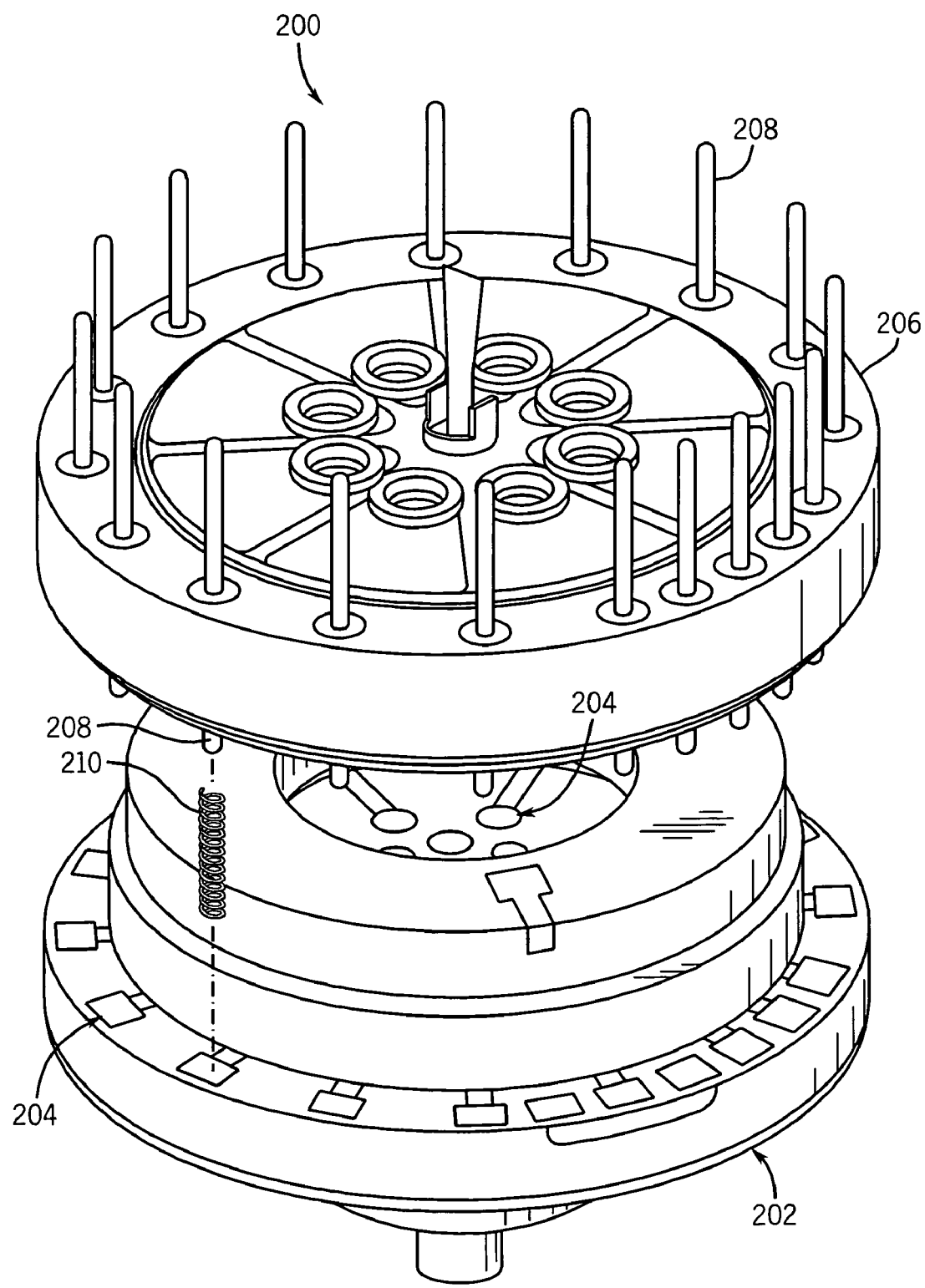
FIG. 2 shows the vibratory rotation sensor of FIG. 1 in conjunction with a header assembly, as known in the art.

The outer support member 12, inner support member 16, and resonator 14 are vacuum sealed to form an HRG subassembly which is depicted by the numeral 202 in FIG. 2. In order to provide electrical connections to external circuitry, a header assembly 206 is provided. A plurality of electrical contact pins 208 are provided in the header assembly 206 in order to make electrical contact with electrical contact pads 204 disposed on exterior surfaces of the HRG subassembly 202. In order to provide appropriate mechanical isolation between the HRG subassembly 202 and the header assembly 206, contact springs 210 may be utilized as part of the electrical pin 208 to contact pad 204 interconnection. The electrical contact pins 208 provide electrical connection to the HRG subassembly 202 for both input and output electrical signals.

Figure 3:
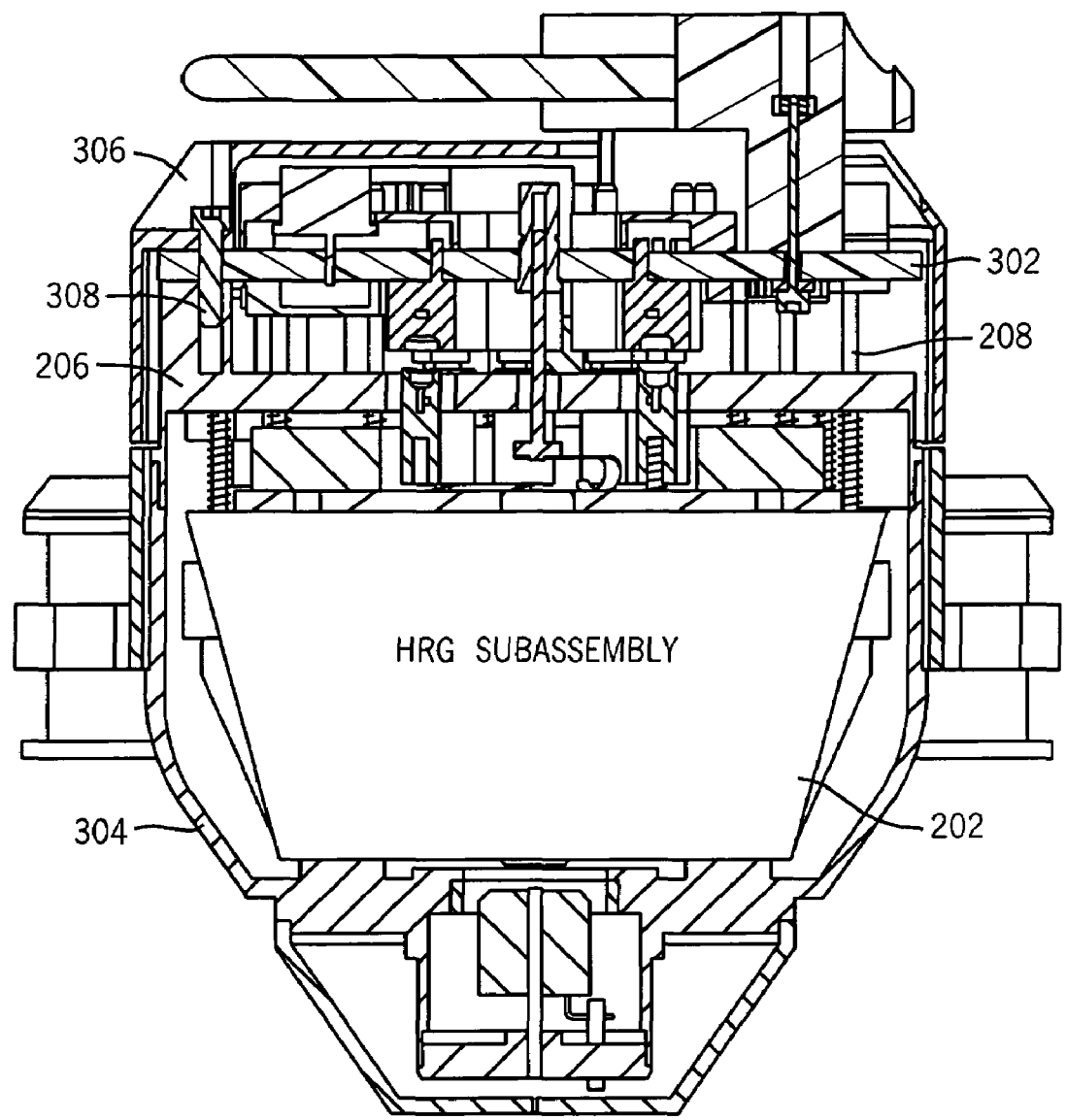
FIG. 3 is a section view of a complete HRG device.

FIG. 3 is a section view of a complete HRG device in which the HRG subassembly 202 is placed into a mechanical housing that includes lower housing 304 and upper housing 306. The HRG subassembly 202 is similar to the HRG subassembly 202 depicted in FIG. 2; however, specific details of the HRG subassembly 202 are not necessary for an understanding of the present invention. Consequently, details of the HRG subassembly 202 are omitted from FIG. 3.

A circuit board 302 is electrically connected to the header assembly 206 via electrical contact pins 208. The circuit board 302, sometimes designated a "printed wiring board" or PWB, includes electronic circuits that provide both excitation and sensing capabilities for use with the HRG assembly 202. The upper housing 306 is secured to the header assembly 206 by cover screws 308. The header assembly 206 is preferably hermetically sealed to the HRG assembly 202. In the mounting arrangement illustrated in FIG. 3, the circuit board 302 is effectively "sandwiched" between the upper housing 306 and the header assembly 206, in order to provide a secure mechanical mounting for the circuit board 302.

In the illustrated implementation, the circuit board 302 is a polyclad polyimide circuit board manufactured in accordance with IPC 4101/40 or /41. As is well-know, the IPC was originally the Institute for Printed Circuits, then changed its name to Institute for Interconnecting and Packaging Electronic Circuits. IPC is now the formal name of the organization, which, among other things, establishes standards for printed circuit boards that have been widely adopted throughout the industry. Of course, other printed circuit constructions, such as G-10 or FR4, for example, may also be suitable in this context, depending upon the ultimate application of the HRG device.

In environments where there are extreme excursions in shock and vibration, the configuration illustrated in FIG. 3 may result in unacceptable mechanical stresses due to the "sandwich" style mounting of the circuit board 302 between the upper housing 306 and the header assembly 206. The upper housing 306 may be termed a first housing element, while the header assembly 206 may be thought of as a second housing element, since the header assembly 206 contributes to the mechanical package integrity of the device. Some of the mechanical stress also stems from the mass distribution on the circuit board 302, as can be seen more clearly in the detail view of FIG. 4.

Figure 4:
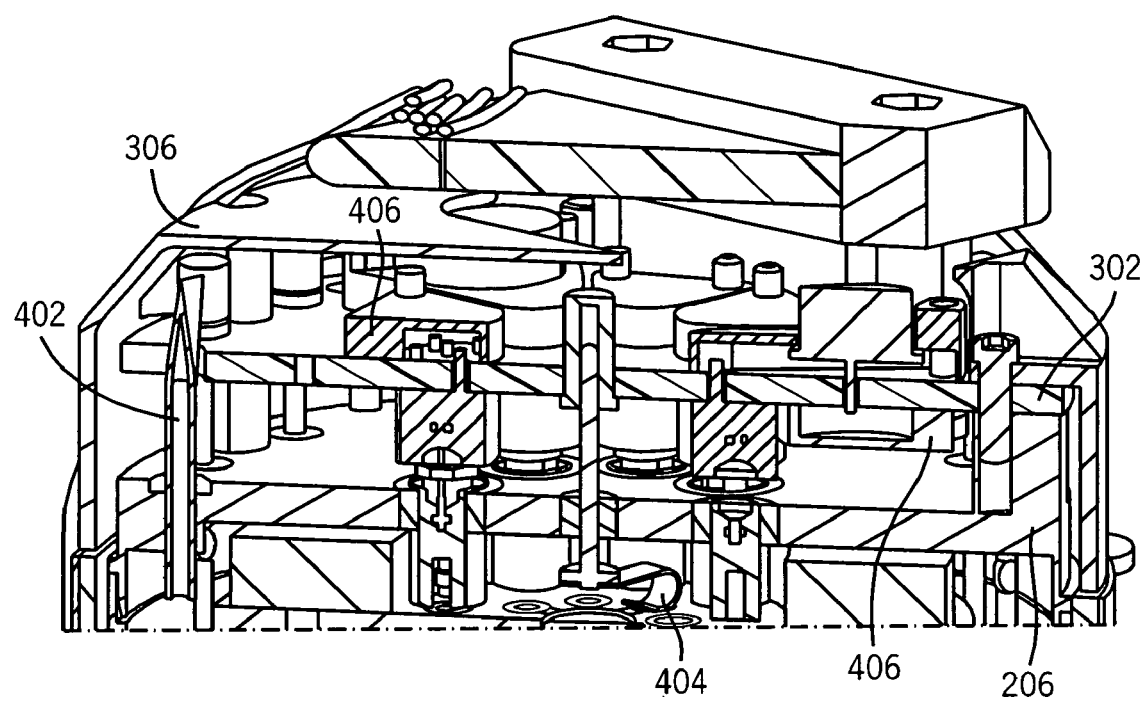
FIG. 4 is a more detailed view of the HRG device of FIG. 3.

FIG. 4 shows that there are a plurality of individual electromagnetic shields 406 disposed on both upper and lower surfaces of the circuit board 302. These shields 406 are necessary to provide appropriate electromagnetic shielding for the driver, sensor, and signal conditioning circuitry disposed on the circuit board 302. However, because of this mass distribution, and because the circuit board 302 is effectively mounted near its perimeter, unwanted vibration modes can occur under certain environmental conditions that may adversely affect operation of the HRG. When resonance occurs in these vibration modes, mechanical standing waves within the circuit board 302 can cause extreme excursions, which can rapidly lead to excess mechanical stress and device failure.

Another feature of the complete HRG device illustrated in FIG. 4 is a pinch tube 402. As noted previously, the resonator portion of an HRG is maintained in a vacuum. In order to accomplish this, assembly of the HRG and the header 206 is generally conducted in a vacuum chamber, and the pinch tube 402 is crimped to provide a seal. The crimp tube structure 402 is inherently fragile, however. The tube 402 itself must be relatively thin so it can be crimped closed. The tube 402 must also be sealed to the header 206, since it is not possible to integrally form the pinch tube 402 within the header 206. This relatively long and thin pinch tube structure is susceptible to vibration modes that can weaken its attachment point to the header 206, thus resulting in a vacuum failure and degradation of device operation.

FIG. 4 further depicts a high voltage contact spring 404 used to provide necessary high voltage to the resonator. This contact spring 404 is basically a flat spring that is bent back on itself to provide both electrical and mechanical contact to the resonator assembly. Unfortunately, this flat spring contact 404 is also susceptible to unwanted vibration modes that can introduce excessive stress to the mechanical and electrical connections, thus degrading device performance and potentially leading to operational failure.

Figure 5:
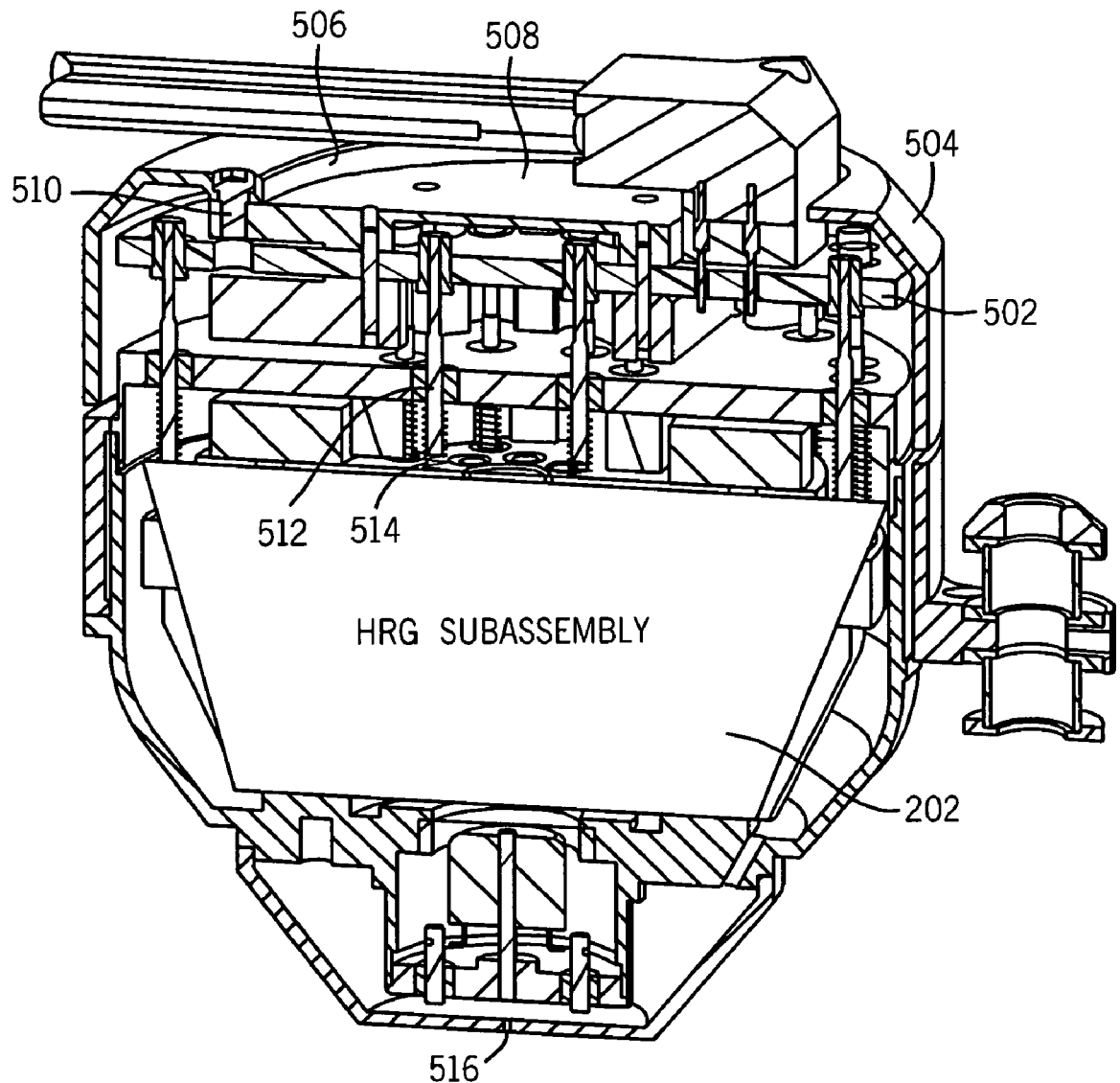
FIG. 5 depicts a modified HRG device in accordance with an exemplary implementation of the invention.

FIG. 5 illustrates one implementation of an improved packaging system designed to minimize undesired vibration modes that may lead to device failure. First, the plurality of electromagnetic shield structures have been replaced by single, unitary electromagnetic shields 508 for both the upper and lower surfaces of the circuit board 502. The flat spring 404 (shown in FIG. 4) has been replaced by a plurality of coil springs 514 and a plurality of electrical contact pins 512.

In addition, the upper housing 504 now has a centrally disposed opening 506 therethrough. This new structure for the upper housing 504 allows the upper electromagnetic shield 508 to effectively become the cover for the completed assembly. Furthermore, instead of "sandwiching" the circuit board 502 between the upper housing 504 and the header, the circuit board 502 is now mounted to the upper housing assembly 504 by a plurality of mounting screws 510 that thread directly into the upper shield 508. Since the shields 508 are securely fastened to the circuit board 502, this mounting technique provides a secure mounting system for the circuit board and reduces overall parts count for the completed assembly. Since circuit board 502 mounting points have now been moved closer to the center of the circuit board 502, and the mass distribution of the electromagnetic shields 508 is also more centralized, unwanted vibration modes of the circuit board 502 are effectively eliminated, this reducing mechanical stress on the completed assembly during shock and vibration occurrences.

In addition to the improved mounting system, the pinch tube 404 (illustrated in FIG. 4) has also been removed. Final assembly of the resonator and header is still conducted in a vacuum chamber, but an evacuation passage 516 is now provided in the lower housing. Instead of necessitating a crimp operation for pinch tube sealing, the evacuation passage 516 is simply laser sealed upon completion of assembly. The laser sealed passage 516 is not susceptible to vibration modes, and consequently provides a high-integrity sealing methodology for the completed assembly.

Figure 6:
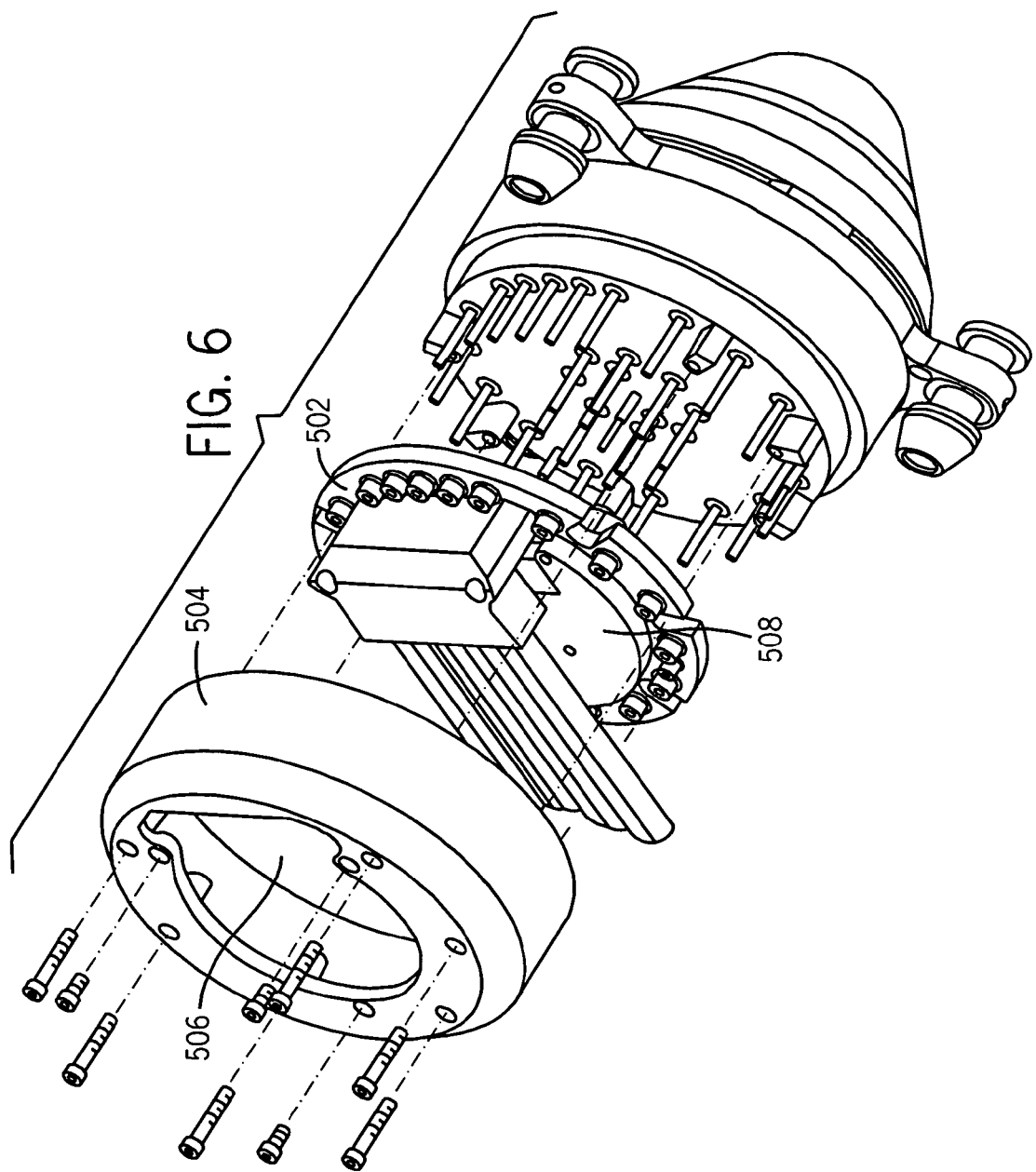
FIG. 6 is a partial exploded view of the HRG device in FIG. 5.

FIG. 6 is an exploded view of the implementation shown in FIG. 5, more clearly illustrating the upper housing 504 and the opening 506 provided therein. Both upper and lower surfaces of the circuit board 502 are now provided with one-piece, unitary electromagnetic shield structures 508. Rather than required a top cover for the completed assembly, the circuit board 502 is secured to the upper housing 506 by attaching directly to the electromagnetic shield 508 on the upper surface of the circuit board 502. This technique provides a cover by virtue of the electromagnetic shield itself, while improving the mechanical mounting of the circuit board 502 by eliminating the previously-known sandwich structure and moving the mechanical mounting points toward the center of the circuit board.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An improved mechanical packaging system for a circuit board disposed between housing elements, the improvement comprising:
    an upper housing member having a centrally disposed opening provided therethrough;
    a unitary electromagnetic shield disposed on at least an upper surface of the circuit board and secured to the circuit board such that the unitary electromagnetic shield substantially occludes the centrally disposed opening in the upper housing member;
    the unitary electromagnetic shield secured to the upper housing member;
    such that undesired mechanical vibration modes are substantially reduced.

2. The improved mechanical packaging system of claim 1, further comprising unitary electromagnetic shields disposed on top and bottom surfaces of the circuit board.

3. The improved mechanical packaging system of claim 1, further comprising at least one electrical and mechanical connection between the circuit board and an associated header assembly, wherein the electrical and mechanical connection is established through an electrical contact pin and a coil spring.

4. The improved mechanical packaging system of claim 1, further comprising a lower housing member having an evacuation passage therethrough.

5. The improved mechanical packaging system of claim 4, wherein the evacuation passage is laser sealed to maintain relatively low-pressure conditions within the lower housing member.

6. The improved mechanical packaging system of claim 5, wherein the relatively low-pressure condition comprises a vacuum.

7. A method for mounting a circuit board, the method comprising the steps of:
    providing at least an upper housing member having a centrally disposed opening therethrough;
    disposing an electromagnetic shield on at least an upper surface of the circuit board substantially occluding the centrally disposed opening in the upper housing member with the electromagnetic shield;
    securing the electromagnetic shield to the upper housing member;
    such that undesired mechanical vibration modes are substantially reduced.

8. The method in accordance with claim 7, further comprising the step of disposing unitary electromagnetic shields on top and bottom surfaces of the circuit board.

9. The method in accordance with claim 7, further comprising the step of providing at least one electrical and mechanical connection between the circuit board and an associated header assembly, wherein the electrical and mechanical connection is established through an electrical contact pin and a coil spring.

10. The method in accordance with claim 7, further comprising the step of providing a lower housing member having an evacuation passage therethrough.

11. The method in accordance with claim 10, wherein the step of providing a lower housing member having an evacuation passage therethrough further comprises the step of laser sealing the evacuation passage to maintain relatively low-pressure conditions within the lower housing member.

12. The method in accordance with claim 11, wherein the relatively low-pressure condition comprises a vacuum.

13. An electro-mechanical assembly comprising:
    an upper housing member having a centrally disposed opening provided therethrough;
    a lower housing member having an evacuation passage therethrough, wherein the evacuation passage is laser sealed to maintain relatively low-pressure conditions within the lower housing member;
    a unitary electromagnetic shield disposed on at least an upper surface of a circuit board disposed between housing elements and secured to the circuit board;
    the unitary electromagnetic shield secured to the upper housing member, the unitary electromagnetic shield substantially occluding the centrally disposed opening in the upper housing member;
    such that undesired mechanical vibration modes are substantially reduced.

14. The electro-mechanical assembly of claim 13, further comprising unitary electromagnetic shields disposed on top and bottom surfaces of the circuit board.

15. The electro-mechanical assembly of claim 13, further comprising at least one electrical and mechanical connection between the circuit board and an associated header assembly, wherein the electrical and mechanical connection is established through an electrical contact pin and a coil spring.

16. The electro-mechanical assembly of claim 14, wherein the relatively low-pressure condition comprises a vacuum.

17. A hemispherical resonator gyro comprising:
    a resonator disposed within upper and lower housing members;
    the upper housing member having a centrally disposed opening provided therethrough;
    the lower housing member having an evacuation passage therethrough, wherein the evacuation passage is laser sealed to maintain relatively low-pressure conditions within the lower housing member;

a unitary electromagnetic shield disposed on at least an upper surface of a circuit board disposed between housing elements and secured to the circuit board;

the unitary electromagnetic shield secured to the upper housing member, the unitary electromagnetic shield substantially occluding the centrally disposed opening in the upper housing member;

such that undesired mechanical vibration modes are substantially reduced.

18. The hemispherical resonator gyro of claim 17, further comprising unitary electromagnetic shields disposed on top and bottom surfaces of the circuit board.

* * * * *